United States Patent Office 2,786,869
Patented Mar. 26, 1957

2,786,869

N-TRIALKYLCARBINYL-N-(HYDROXYETHYL-POLYOXYETHYL) GLYCINES

Peter L. de Benneville and Homer J. Sims, Philadelphia, Pa., assignors to Rohm & Haas Company, Philadelphia, Pa., a corporation of Delaware No Drawing. Application June 16, 1954,
Serial No. 437,273

9 Claims. (Cl. 260—534)

This invention relates to compounds of the structure $$R^2-\underset{R^3}{\overset{R^1}{\underset{|}{C}}}-N\begin{cases}(CH_2CH_2O)_nH\\CH_2COOH\end{cases}$$

wherein $R^1$, $R^2$, and $R^3$ are alkyl groups containing a total of 11 to 23 carbon atoms and $n$ is an integer having a value from 5 to about 50 or more, preferably 5 to 25. These compounds may be called N-(trialkylcarbinyl)-N-(hydroxyethylpolyoxyethyl)glycines or N-carboxymethyl-N-trialkylcarbinylaminopolyethoxyethanols.

As these names suggest, these compounds are polyether alcohols and glycines. They possess in addition to the ether chain which confers marked polar properties a zwitter-ion which can react with either acids or bases to form salts and thereby change the surface active characteristics of the compounds. In contrast to the usual non-ionic surface active agents, these compounds supply anti-corrosive action. They confer anti-static properties to plastic surfaces, including the surfaces of synthetic fibers. They are preferentially absorbed on various solids, including pigments, ores, and other minerals and can thus assist in classification, flotation, dispersion, and adhesion. They can be used as anti-foam agents, as in paper manufacture. They have bactericidal and fungicidal properties. They can be used as emulsifiers and as deemulsifiers. They are effective wetting agents in many textile and paper applications. Also, the compounds of this invention can be incorporated into plastisols and organasols to reduce the viscosity thereof.

The compounds of this invention can be considered to be derived from tert-alkylamines through an interesting series of reactions which are effective because of the peculiar nature of the trialkylcarbinyl group in its relationship to the rest of the molecule. The course of reaction is also determined by the size of the trialkylcarbinyl groups used, these being of 12 to 24 carbon atoms. With this particular kind of group of the defined size the first stages of reaction lead to the introduction of a polyethoxyethanol group replacing only one of the two hydrogens on the nitrogen of the primary amine, $RNH_2$, although it would appear that both are of equal value and activity. Two steps are required to introduce a polyethoxyethanol group, the first giving an N-hydroxyethyl compound and the second carrying this compound to the polyethoxyethanol. When the polyethoxyethanol group has been introduced, giving compounds of the formula $RNH(CH_2CH_2O)_nH$, these compounds are reacted with formaldehyde and hydrogen cyanide or the equivalent thereof, to give monocyanomethylated products, $RN(CH_2CN)(CH_2CH_2O)_nH$. These are now subjected to hydrolysis with an aqueous alkali metal hydroxide solution and the resulting salt separated or converted to the acid form, $RN(CH_2COOH)(CH_2CH_2O)_nH$.

As trialkylcarbinylamines there may be used any of the primary N-tertiary alkylamines having 12 to 24 carbon atoms. Single entities may be used or, more practically, mixtures of tert-alkylamine such as are available on the market. Typical mixtures are those containing $C_{12}H_{25}NH_2$ to $C_{15}H_{31}NH_2$ or $C_{18}H_{37}NH_2$ to $C_{24}H_{49}NH_2$ or $C_{15}H_{31}-$ to $C_{24}H_{49}NH_2$. These may be represented by the formula $$R^2-\underset{R^3}{\overset{R^1}{\underset{|}{C}}}-NH_2$$

As catalysts in the first step of the process of this invention, wherein the hydroxyethyl group is introduced, there may be used any of the strong acids, such as hydrochloric, hydrobromic, sulfuric, arylsulfonic, alkanesulfonic, or phosphoric. The preferred amount of this catalyst is 10 to 30 mole percent of the amine. With amines from 12 carbon atoms upward it is exceedingly difficult to introduce more than one hydroxyethyl group in a tert-alkylamine molecule. Such amines yield final products which have the desired balance of properties.

The first reaction with ethylene oxide is effected by bringing together ethylene oxide and tert-alkylamine, usually by passing ethylene oxide into amine and catalyst, at temperatures from 0° to 180° C. The preferred temperatures for reaction are between 60° and 95° C.

Upon addition of one mole of ethylene oxide per mole of a said tert-alkylamine in the presence of an acid catalyst reaction ceases. The acid catalyst is then destroyed, as by adding a base. Sodium or potassium hydroxide, sodium or potassium carbonate, or calcium hydroxide may be used for this purpose. A concentrated aqueous alkali solution may be used and the resulting aqueous layer is drawn off. If an aqueous solution is not used, the sludge or salt which forms is filtered off. The reaction mixture is then stripped of any remaining water, as by heating under reduced pressure. This step is necessary to avoid formation of polyethylene glycols in the subsequent reaction.

In the next stage of reaction the monohydroxyethyl compound is treated with 0.5 to 5 mole percent of an alkaline catalyst and with ethylene oxide in an amount to give the particular kind of product required. Sodium hydroxide or potassium hydroxide provide good catalytic action, but alkali metal alcoholates, such as sodium methoxide or potassium butoxide may also be used. The reaction may be run under ordinary or elevated pressures. A pressure of 10 to 20 p. s. i. provides a rapid rate of reaction at temperatures from 100° to 200° C. The preferred range is 130° to 170° C.

When four or more units of ethylene oxide have been taken up at this stage per molecule of hydroxyethylated tert alkylamine, final products are obtained which are water-soluble. As the number of ethoxy groups increases above four, improved solubility and increased polarity are observed. The products can thus be adjusted to give an optimum effect for any specific application.

Details of typical procedures for preparing the $$RNH(CH_2CH_2O)_nH$$

compounds are given in the following section.

PREPARATION A

There were mixed in a reaction vessel equipped with stirrer, thermometer, and inlet tube 286 parts of a technical tert-octadecylamine, which comprised chiefly $C_{18}$ amines with some higher tert-alkyl primary amines, and 28.6 parts of aqueous 35% hydrochloric acid. The mixture was stirred and heated to about 90° C., whereupon ethylene oxide was introduced through the inlet tube. The temperature was held at 90°–94° C. and the pressure at one to five pounds gauge until 44 parts of ethylene oxide had been added. The water was then taken off under reduced pressure and about 200 parts of aqueous 5% sodium hydroxide solution added. The water layer was taken off and a second 200 part portion of 5% sodium hydroxide added and then separated. The washed oil was stripped under low pressure and filtered to give 330 parts of a clear red oil. This had a neutral equivalent of 326, thus corresponding essentially to N-hydroxyethyl-tert-octadecylamine, the theoretical netural equivalent being 330.

A portion of 99 parts of this oil was treated with 0.3 part of potassium hydroxide. There was added thereto over a period of four hours 132 parts of ethylene oxide with the temperature held at 160°–170° C. at one to five pounds pressure (gauge). The reaction mixture was treated with 1.3 parts of 20% sulfuric acid, stripped, and filtered.

The final product was a clear red oil which was soluble in water to give surface active solutions and which corresponded in composition to

tert-C18H17NH(CH2CH2O)10CH2CH2OH

PREPARATION B

A technical mixture of trialkylcarbinylamines from $C_{18}$ to $C_{24}$ having a neutral equivalent of 360 was reacted as in Preparation A with a molar proportion of ethylene oxide. There was thereby formed an N-hydroxyethyl-tert-carbinylamine having a neutral equivalent of 405, a density at 50° C. of 0.865, and a congealing temperature of —15° C.

Portions of this product were taken and reacted as above with various proportions of ethylene oxide to give tert-carbinylaminopolyethoxyethanols. Reaction in the proportion of one mole of N-hydroxyethyl-tert-carbinylamine to five moles of ethylene oxide gave a product having an average of five ethoxy groups, having a density of 0.938 at 50° C. and a congealing temperature of 0° C., and being scarcely soluble in water, but soluble in such organic solvents as benzene. The solutions in organic solvents took up water.

The product formed from a proportion of one mole of hydroxyethylamine to ten moles of ethylene oxide had a composition $C_nH_{2n+1}NH(CH_2CH_2O)_{10}CH_2CH_2OH$, had a density of 0.970 at 50° C. and a congealing point of 6° C., and was spontaneously emulsifiable in water.

The product formed from a proportion of hydroxyethylamine to oxide of 1:15 corresponded in composition to $C_nH_{2n+1}NH(CH_2CH_2O)_{15}CH_2CH_2OH$, had a density of 1.005 at 50° and a congealing point of 8° C., and was soluble in water up to 62° C.

The product formed from a proportion of hydroxyethylamine to oxide from 1:20 corresponded in composition to $C_nH_{2n+1}NH(CH_2CH_2O)_{20}CH_2CH_2OH$, had a density of 1.020 to 50° C. and a congealing point of 12° C., and was soluble in water up to 94° C.

PREPARATION C

Ethylene oxide was passed at 80° C. into a mixture of 200 parts of trialkylcarbinylamine containing chiefly a tert-dodecyl group together with some higher alkyl groups up to tert-pentadecyl, 20 parts of aqueous 35% hydrochloric acid, and 15 parts of water. After three hours 32 parts of ethylene oxide had been reacted. The reaction mixture was washed with aqueous 15% sodium hydroxide solution and with 250 parts of water. The reaction mixture was then distilled. After unreacted amines had been taken off, a main fraction of 139 parts of N-hydroxyethyltrialkylcarbinylamine was obtained at 157°–1169° C./15 mm. The residue amounted to 14 parts.

The main fraction, having a neutral equivalent of 235, was treated as above with three mole percent of sodium hydroxide and with ethylene oxide in a mole ratio of 10:1, oxide to amine. The product gave clear solutions in water which are highly surface active, giving rapid wetting out, and having effective emulsifying action.

The preparation of tert-aminoalkylaminopolyethoxyethanols is described and claimed in application Serial No. 371,194, filed by Gerard C. Riley on July 29, 1953, the assignment of which is in the hands of a common assignee. Sufficient of the disclosure has been here introduced to give a clear and complete exposition of the preparation of the tert-alkylaminopolyethoxyethanols which are required for the preparation of the glycines of this invention.

After a tert-alkylaminopolyethoxyethanol has been formed, it is reacted with formaldehyde and hydrogen cyanide, thus $$RNH(CH_2CH_2O)_nH + HCHO + HCN \longrightarrow$$
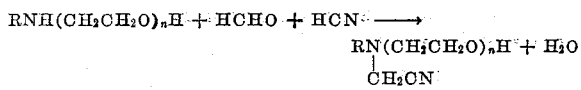
$$RN(CH_2CH_2O)_nH + H_2O$$
$$|$$
$$CH_2CN$$

The order in which these reactants are mixed or combined is not critical. Excess formaldehyde and hydrogen cyanide are permissible and may be supplied to the reaction mixture as separate reactants. Again, the tert-alkylaminopolyethoxyethanol may be first treated with formaldehyde, as from the aqueous solutions of commerce and hydrogen cyanide then added as liquid or gas at temperatures from 0° to 50° C. or more. It is more convenient, however, to react formaldehyde and cyanide in a separate step to form glycolonitrile and mix this with the tert-alkylaminopolyethoxyethanol. This reaction may be carried out in water or an alcohol-water mixture at temperatures of about 20° to 100° C. The glycolonitrile may be formed by reacting formaldehyde and hydrogen cyanide or an alkali metal cyanide and acid, as is known.

The N - cyanomethylated tert - alkylaminopolyethoxyethanol is now hydrolyzed. This is done by heating it with an aqueous solution of an alkali metal hydroxide. Temperatures from 90° to 120° C. are suitable. Ammonia is evolved and the sodium or potassium or equivalent salt of the carboxymethyl derivative is formed.

This salt may be used as such or it may be converted to the acid form. This is readily accomplished by treating the salt with a strong inorganic acid, such as aqueous sulfuric or hydrochloric acid to bring the solution below pH 7. The inorganic salt formed is conveniently removed by taking up the reaction product in a solvent in which the salt is insoluble and filtering off the salt. There are, of course, applications for which removal of inorganic salt is unnecessary and then this last step is not required.

Typical preparations of the compounds of this invention are presented in the following illustrative examples, wherein parts are by weight.

*Example 1*

As the starting material in this synthesis there is selected a commercial tert-alkylamine which has an average molecular weight of 320 and which consists of a mixture of amines of the formula $RNH_2$, where R represents alkyl groups of 15 to 24 carbon atoms joined to the nitrogen at a tertiary carbon atom thereof. This amine is reacted with ethylene oxide, as described above, in two stages to give an N-polyethoxyethanol product with an average —$C_2H_4$— group content of 15.

There are mixed 99 parts of this tert-alkylaminopolyethoxyethanol and 8 parts of an aqueous 71.4% glycolonitrile solution, which has been made by bringing formaldehyde and hydrogen cyanide together in an aqueous solution at 20°–25° C. in the presence of a small amount of pyridine as catalyst and then acidifying the solution. The mixture is stirred and heated at 50° C. for 4.5 hours. The reaction mixture is then heated under reduced pressure to remove water. This leaves a residue of 102 parts, which is identified as a composition of the formula $RN(CH_2CN)(CH_2CH_2O)_{15}H$. This material contains by analysis 2.76% of nitrogen. The theoretical nitrogen content is 2.72%.

There are mixed 90 parts of the above composition, 50 parts of water, and 12 parts of aqueous 50% sodium hydroxide solution. The mixture is heated under reflux for 15.5 hours. Ammonia is evolved and is collected to indicate the progress of hydrolysis. When ammonia is no longer given off, the reaction mixture is cooled and adjusted to a pH between 5 and 6, as shown by Bogen's indicator, by adding 11 parts of aqueous 50% sulfuric acid solution. Addition is made of 100 parts of isopropyl alcohol. A salt separates and is filtered off. The filtrate is heated to distill off the alcohol. The product is treated with 200 parts of toluene which is distilled off to remove moisture present. The last traces of toluene are removed under reduced pressure. The residual product amounts to 67 parts. It contains no inorganic matter as shown by a failure to give ash and corresponds in composition fairly closely to that of the compound $RN(CH_2COOH)(CH_2CH_2O)_{15}H$.

The addition of 1% of this material to a plastisol (made from equal weights of a dispersion grade of polyvinyl chloride and di-2-ethylhexyl phthalate) reduces the viscosity thereof about 45%.

This material acts as a potent corrosion inhibitor in 10% hydrochloric acid.

Example 2

The starting amine used in this preparation is the same as that used in Example 1. It is reacted with ethylene oxide as above to introduce five ethoxy groups. To 154 parts of this tert-alkylaminotetraethoxyethanol there is added 20.4 parts of aqueous 70% glycolonitrile solution. This mixture is stirred and heated at 50° C. for two hours.

To this reaction mixture are added 50 parts of water and 32 parts of aqueous 50% sodium hydroxide solution. This mixture is heated under reflux until evolution of ammonia is complete. The resulting solution is acidified with dilute sulfuric acid to a pH of 6. Isopropyl alcohol is added to precipitate sodium sulfate, 300 parts being thus required. The precipitated salt is filtered off. The filtrate is stripped of isopropyl alcohol. The resulting residue is treated with 200 parts of toluene which is distilled off to give a residue which is heated under reduced pressure to give 150 parts of an amber-colored product. By analysis this material contains 2.7% of nitrogen and gave 0.2% of ash. This material corresponds in composition to $RN(CH_2COOH)(CH_2CH_2O)_5H$, for which the theoretical nitrogen content is 2.7%.

When a plastisol from 50% polyvinyl chloride and 50% dioctyl phthalate is treated with 1% of its weight of the above product, there occurs a 41% reduction in viscosity. This reduction is well, although not completely, retained on storage.

The product possesses corrosion inhibiting action, as can be shown by a standard test wherein steel panels are subjected to 10% hydrochloric acid for six hours at 175° C.

This product has been examined for anti-bacterial action. Against *Salmonella typhosa* it has a phenol coefficient of 4.2. Against *Micrococcus pyogenes* var. *aureus* it shows a phenol coefficient of 17.

An 0.1% solution in water gives a surface tension of 25.5 dynes per cm. The solutions have good wetting action. Wetting out time by the floating patch test is 7 seconds at 1%, 17 seconds at 0.5% and 31 seconds at 0.25%.

Example 3

In this preparation the above tert-alkylamine is used, but reaction with ethylene oxide is carried on until 25 ethoxy groups have been added. There are mixed 170 parts of the resulting secondary amine, $RNH(CH_2CH_2O)_{25}H$

8.1 parts of 37% aqueous formaldehyde, and then 2.7 parts of cold hydrogen cyanide. The mixture is stirred at room temperature for several hours, left standing for 16 hours, and heated with stirring at at about 50° C. for two hours. At this point the desired aminonitrile has been formed, but it need not be isolated. Instead, this reaction mixture is treated with 54 parts of water and 12 parts of aqueous 50% sodium hydroxide solution and heated under reflux with evolution of ammonia. The solution is brought to a pH of 6 by addition of about 11 parts of aqueous 50% sulfuric acid solution. Isopropyl alcohol is added to give precipitation of sodium sulfate, about 200 parts being required. The solution is evaporated. The residue is treated with 200 parts of toluene, which is distilled off. A residue of 169 parts remains. Analysis shows 1.2% ash and titration with standard 0.1 N sodium hydroxide solution shows that at this point 70% of the theoretical carboxyl groups are present.

Part of this product is treated again with caustic soda solution to complete hydrolysis. The product is also tested in a plastisol, addition of 1% giving a 48% decrease in viscosity.

Example 4

The tert-alkylaminopolyethoxyethanol of Preparation A is taken as the starting material. This compound corresponds closely to the formula tert-$C_{18}H_{37}NH(C_2H_4O)_{11}H$

There are mixed 75 parts of this compound and 8 parts of aqueous 72% glycolonitrile solution. The mixture is stirred and heated to about 55° C. for four hours and then heated under reduced pressure to remove water. The residue corresponds closely in composition to that of $C_{18}H_{37}N(CH_2CN)(CH_2CH_2O)_{11}H$, containing 3.58% of nitrogen (theory 3.57%).

There are mixed 75 parts of this intermediate, 40 parts of water, and 10 parts of aqueous 50% sodium hydroxide solution. This mixture is heated under reflux for 16 hours. Ammonia is evolved in about the theoretical amount. Sulfuric acid is added until the pH of the mixture is about 5. Isopropyl alcohol is added until precipitation of sodium sulfate is complete. It is filtered off. The filtrate is evaporated under reduced pressure. The residue is treated with toluene and the toluene is distilled off. The residue is stripped under reduced pressure. The product is essentially free of ash and corresponds in composition to $C_{18}H_{37}N(CH_2COOH)(CH_2CH_2O)_{11}H$.

Example 5

The tert-alkylaminopolyethoxyethanol of Preparation C (74 parts) is mixed with nine parts of glycolonitrile 72% solution. This mixture is heated at 50° to 60° C. for five hours and heated under reduced pressure with evolution of water. The residue is the cyanomethylated derivative, being chiefly $C_{12}H_{25}N(CH_2CN)(CH_2CH_2O)_{11}H$

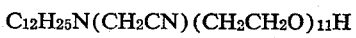

with small amounts of higher alkyl derivatives. The nitrogen is 4.14%. The theory for the $C_{12}$ compound is 4.19%.

There are mixed 75 parts of this product, 45 parts of water, and 12 parts of aqueous 50% sodium hydroxide solution. This mixture is heated under reflux overnight with evolution of ammonia. The reaction mixture is cooled, treated with 50% sulfuric acid as above to a pH of 5 to 6. Isopropyl alcohol is added until precipitation of sodium sulfate is complete. This salt is filtered off and the filtrate is concentrated under reduced pressure. Water is stripped off with toluene as before to give a product chiefly of the composition $C_{12}H_{25}N(CH_2COOH)(CH_2CH_2O)_{11}H$

which may be identified as a N-carboxymethyl-N-tert-dodecylaminopolyethoxyethanol.

The same procedure can be applied to produce compounds with 12 to 24 carbon atoms in the tert-alkyl group and from 5 to 25 to 50 or more ethoxy groups. For some purposes of wetting and emulsifying compounds with 40 to 60 ethoxy groups are very desirable.

We claim:
1. Compounds of the structure

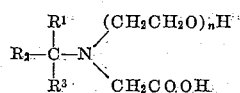

where $R^1$, $R^2$, and $R^3$ are alkyl groups totaling 11 to 23 carbon atoms and $n$ is an integer from 5 to about 50.

2. N - carboxymethyl-N-tert-dodecylaminopolyethoxyethanols having four to forty-nine ethoxy groups.

3. N - carboxymethyl-N-tert-dodecylaminopolyethoxyethanol with ten ethoxy groups.

4. N-carboxymethyl-N-tert-octadecylaminopolyethoxyethanol, having four to forty-nine ethoxy groups.

5. N-carboxymethyl-N-tert-octadecylaminopolyethoxyethanol, having ten ethoxy groups.

6. A process for preparing N-carboxymethyl-N-tert-alkylaminopolyethoxyethanols which comprises reacting an N-hydroxyethylpolyoxyethyl - N - tert-alkylamine in which the said alkyl group contains 12 to 24 carbon atoms with formaldehyde and hydrogen cyanide, whereby an N-cyanomethyl - N - hydroxyethylpolyoxyethyl-N-tert-alkylamine is formed, and hydrolyzing said amine by heating it with aqueous alkali metal hydroxide solution.

7. A process for preparing N-carboxymethyl-N-tert-alkylaminopolyethoxyethanols which comprises reacting an N-hydroxyethylpolyoxyethyl - N - tert-alkylamine in which the said alkyl group contains 12 to 24 carbon atoms with glycolonitrile, whereby an N-cyanomethyl-N-hydroxyethylpolyoxyethyl-N-tert-alkylamine is formed, and hydrolyzing said amine by heating it with aqueous alkali metal hydroxide solution, bringing the resulting solution to a pH below 7, and separating an N-carboxymethyl-N-tert-alkylaminopolyethoxyethanol.

8. The process of claim 7 in which the tert-alkylamine is tert-dodecylamine.

9. The process of claim 7 in which the tert-alkylamine is tert-octadecylamine.

References Cited in the file of this patent

UNITED STATES PATENTS

| 2,017,537 | Hoffman et al. | Oct. 15, 1935 |
| 2,313,573 | Orthner et al. | Mar. 9, 1943 |
| 2,407,645 | Bersworth | Sept. 17, 1946 |

FOREIGN PATENTS

| 388,874 | Great Britain | Mar. 9, 1933 |
| 188,770 | Switzerland | Apr. 16, 1937 |